3,109,339
SPLITTING MACHINE FOR SHEET MATERIAL
Dieter Braun, Stuttgart-Bad Cannstatt, Ernst Focke, Stuttgart, and Kurt Hacker, Stuttgart-Zuffenhausen, Germany, assignors to Fortuna-Werke Spezialmaschinenfabrik A.G., Stuttgart-Bad Cannstatt, Germany
Filed Feb. 9, 1961, Ser. No. 88,161
Claims priority, application Germany Feb. 10, 1960
20 Claims. (Cl. 83—4)

The present invention relates to a splitting machine for sheet material, and more particularly to a control arrangement for a splitting machine by which an irregular sheet material, such as animal skins, is split into two layers one of which is to be cut to a selected thickness.

Machines of this type are known in which the sheet material is compressed between a pair of transporting rollers and transported by the same toward a cutting means, for example a moving cutter band located in the plane of the sheet material so as to cut the same into two layers.

In view of the fact that the hardness and compressibility of the sheet material varies to a great extent, the spacing of the transporting and compressing roller from the cutting edge of the cutter band does not fully determine the thickness of the split-off layer which is finally used. The differences of the properties of hard leather, soft suede, or even rubber sheets is so substantial that these materials expand to a different extent after being released from the pressure between the transporting rollers and the cutter band.

Consequently, it has been necessary to measure and to assort the split sheets produced by the prior art machines, or to assort the sheet material according to hardness and thickness so that the splitting machines could be supplied with workpieces having similar properties. Nevertheless, it has not been possible to obtain finished split pieces having a selected thickness within desirable tolerances.

If the produced split material is too thick or too thin, the transporting rollers have to be adjusted for the next workpiece. However, if the split workpiece is too thin, it must be discarded, while workpieces which turn out too thick can be run a second time through the machine. The amount of adjustment on the transporting rollers has to be estimated in the machines of the prior art, and even the adjusted transporting rollers may turn out material having an undesired thickness. It is customary to determine the thinnest portion of each sheet material, and to adjust the transporting rollers to cut a layer corresponding to such thinnest portion, in which event split layers of different thickness are produced of different skins.

However, even if the transporting rollers are properly adjusted, a uniform thickness of the split layer is not assured, since the parts of a skin may be of different hardness, depending on whether the skin comes from the back, the side, or any other part of the animal. In view of these facts, split material produced by the machines of the prior art, practically require measuring of each workpiece, causing loss of time, and unduly high labor costs.

It is one object of the present invention to improve the splitting machines of the prior art, and to provide a splitting machine for sheet material capable of producing a split layer of uniform thickness irrespective of the properties and thickness of the split sheet material.

Another object of the present invention is to provide a splitting machine for animal skins capable of splitting layers of uniform thickness from irregular skins.

Another object of the present invention is to provide a splitting machine with a control device including a feeler measuring the thickness of a split-off layer of the split sheet material.

Another object of the present invention is to measure the sheet material between a feeler and a roller moving at the same peripheral speed as the sheet material, for example one of the transporting rollers.

Another object of the present invention is to transmit the feeler motion to control means controlling a motor by which a transporting roller is pressed against the transported sheet material and a counter-pressure roller for adjusting the position of the sheet material relative to the cutting means.

Another object of the present invention is to provide a control circuit for effecting adjustment of the machine in such a manner that a sheet having a thickness within a selected range of tolerances is produced.

With these objects in view the present invention relates to a splitting machine for splitting a sheet material, such as leather or rubber. One embodiment of the machine comprises cutting means, for example a moving cutter band; transporting means for transporting the sheet material toward the cutting means and for pressing the sheet material against the cutting means; and a control device including a feeler located behind the cutting means for sensing the thickness of a layer split off the sheet material by the cutting means. The control device is connected to the transporting means to adjust the same relative to the cutting means until the feeler senses a desired thickness of the split-off layer. In this manner, a layer of the desired thickness can be obtained irrespective of the thickness, compressibility and actual compression of the sheet material.

In the preferred embodiment of the invention, the transporting means include a driven pressure roller, and a resiliently supported counter-pressure roller. The rollers transport the material in one direction toward the cutting means, and the pressure roller is driven and movable toward and away from the counter-pressure roller and is adjusted by a motor in accordance with the position of the feeler.

A meter measures the displacement of the feeler, and operates a movable contact between two stationary contacts which are connected in the circuit of the motor to effect reversal of the motor when the movable contact engages one of the two fixed contacts. In the intermediate position of the movable contact, the motor is not energized and the pressure roller is not adjusted, since a split layer having the desired thickness within the range of tolerances is being produced. Engagement of the movable contact with one of the stationary contacts indicates that the produced layer is either too thick or too thin, and the motor effects the corresponding adjustment of the pressure roller until the feeler senses a split layer having the desired thickness.

The motor can also be operated by manually controlled switches to obtain a preliminary setting of the pressure roller according to a suitable indicator. The position of the meter relatvie to the feeler can also be manually adjusted, and a scale is provided for indicating the position of the meter.

A control switch is operated by the resiliently supported counter-pressure roller to permit operation of the motor only when sheet material has been inserted into the transporting means. Preferably, delay means are provided in the circuit of the motor so that no adjustment takes place before the leading portion of the material has reached the feeler.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

Figure 1:
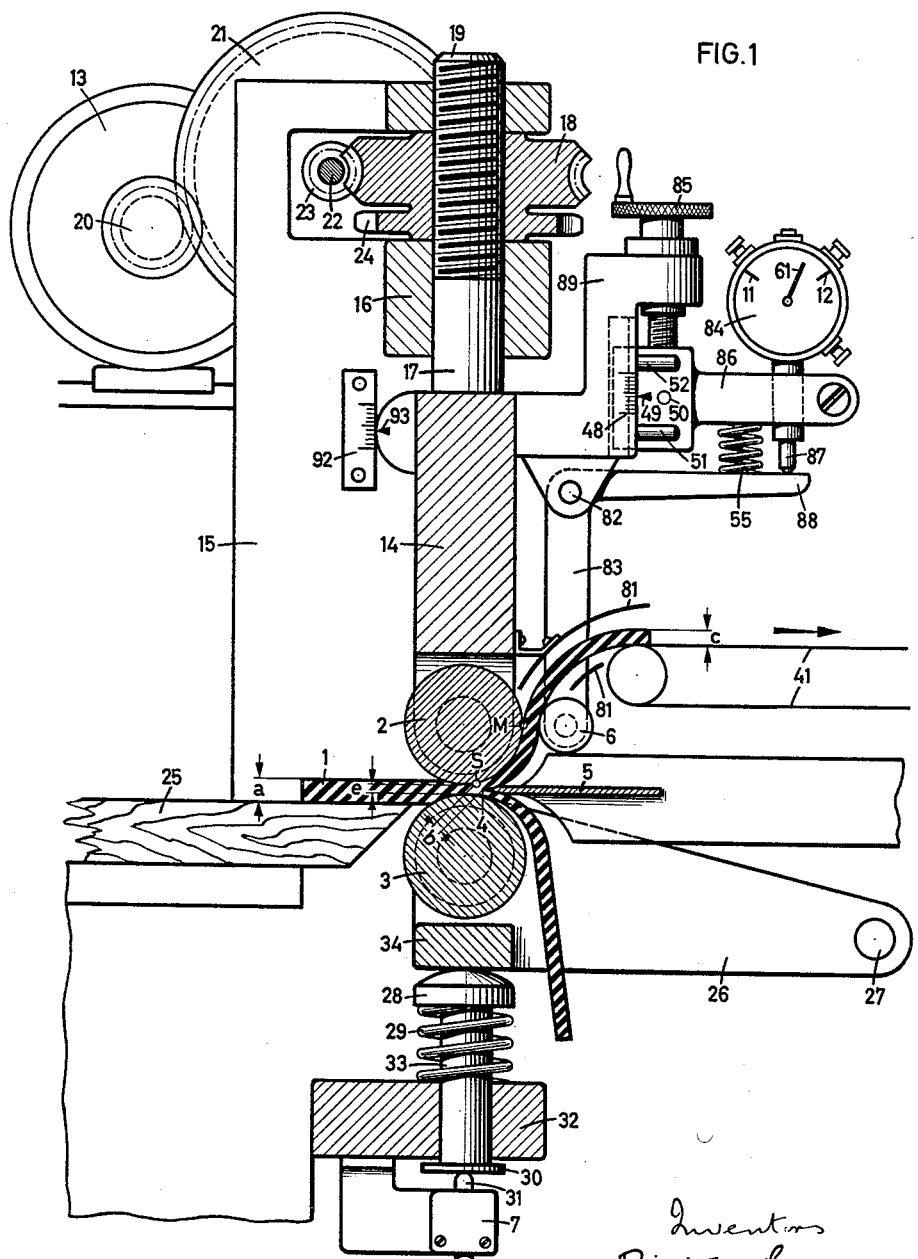
FIG. 1 is a fragmentary sectional view illustrating a preferred embodiment of the invention.

Referring now to the drawings, and more particularly to FIG. 1, the frame 15 of the machine has a horizontal portion 16 in which spindle means 19 are mounted for axial movement, but non-turnable. The spindle 19 has a threaded portion with which a threaded inner bore of a worm gear 18 meshes so that turning of gear 18 effects axial displacement of spindle 17 together with a support 14 on which a roller 2 is turnably mounted. Roller 2 is driven by a motor, not shown, mounted on support 14.

The worm gear 18 meshes with the worm screw 23 on a shaft 22 of a gear 21 which meshes with a gear 20 on the shaft of a drive motor 13. In accordance with the direction of rotation of motor 13, roller 2 will be either raised or lowered. A chain wheel 24 is integral with the worm gear 18, and serves for connecting the drive motor 13 to another spindle, not shown, of a corresponding arrangement.

The counter-pressure roller 3 is located opposite pressure roller 2, and is turnably mounted on a supporting arm 26 which is pivotally supported by a shaft 27. A projection 34 of supporting arm 26 is engaged by a shiftable member 33 which is mounted in a frame portion 32 of the machine. A spring 29 abuts the head 28 of shiftable member 33 and urges the same against projection 34 so that supporting arm 26 moves upwardly together with counter-pressure roller 3. A flange 30 of shiftable member 33 engages frame portion 32 in an end position of shiftable member 33 in which the peripheral surface of counter-pressure roller 3 is located in a working plane passing through a cutter band 5 having a cutting edge 4.

A work table 25 has an upper surface located slightly below the working plane, and supports a workpiece 1 for movement toward the gap between pressure roller 2 and counter pressure roller 3. When a workpiece 1 is located between rollers 2 and 3, roller 3 is displaced from its normal position, so that flange 30 moves away from frame portion 32 and engages the pin 31 of a control switch 7 to close control switch 7 which is open when no workpiece 1 is located between the rollers.

A workpiece gripped by rollers 2 and 3 is compressed and has the thickness $e$ instead of its natural thickness $a$. The workpiece is pressed against the cutting edge 4 and split into two layers which resiliently expand again to have the thicknesses $c$ and $d$, respectively. The initial thickness $a$ of a sheet material 1 is the sum of the thicknesses $c$ and $d$. However, along the line S where a plane passing through the axis of the pressure roller 2 and through the cutting edge 4 intersects with the peripheral surface of pressure roller 2, the upper layer is still compressed between roller 2 and the cutter band 5. Due to the variable properties of the used sheet material, the thickness $c$ cannot be determined from the width of the gap $e$, or from the width of the gap $b$.

In the illustrated embodiment, the cutter band 5 is an endless loop slidably guided in a slot of a support, and having a cutting edge 4 moving in axial direction of the rollers 2 and 3. Only the upper split layer is used, and the lower split layer is discarded as waste. The upper layer is received by a conveyor means 41 and transported to a suitable place where it can be deposited.

A scale member 92 is secured to the frame 15, and cooperates with a pointer 93 on the movable support 14. The scale 92 preferably indicates the thicknesses $c$ of the usable split layer which is expected to be obtained in the respective position of the pressure roller 2. However, the scale 92 may also be designed to indicate the compressibility of the material.

Support 14 has an arm 89 on which a slide 86 is mounted for movement in the same direction in which the pressure roller 2 is adjusted by motor 13. A manually operated member 85 is connected through a micrometer drive to a threaded spindle which meshes with a corresponding inner thread in slide 86 to move slide 86 between terminal positions in which a fixed pin 50 on slide 86 abuts two spaced stops 51 and 52 on supporting arm 89.

Slide 86 has a projecting arm in which a meter 84 is mounted. The sensing finger 87 of meter 84 is operatively connected to a pointer 61 which is also a movable contact turning between two end positions determined by two fixed contacts 11 and 12.

The feeler means includes an angular lever 83, 88 which is turnably mounted on a pin 82 on a bracket 94 on supporting arm 89. A spring 55 abuts arm 86 and arm 88, and urges lever 83, 88 to turn in clockwise direction so that a feeler roller 6 which is turnably mounted on lever arm 83, is urged against the upper split layer of a workpiece, and toward the pressure roller 2.

A pointer 49 on slide 86 cooperates with a scale means 48 on supporting arm 89, so that the position of slide 86, and thereby of meter 84 can be pre-set. The desired thickness of a split layer $c$ is set by operating handle 85 until pointer 49 indicates the respective thickness $c$.

Figure 3:
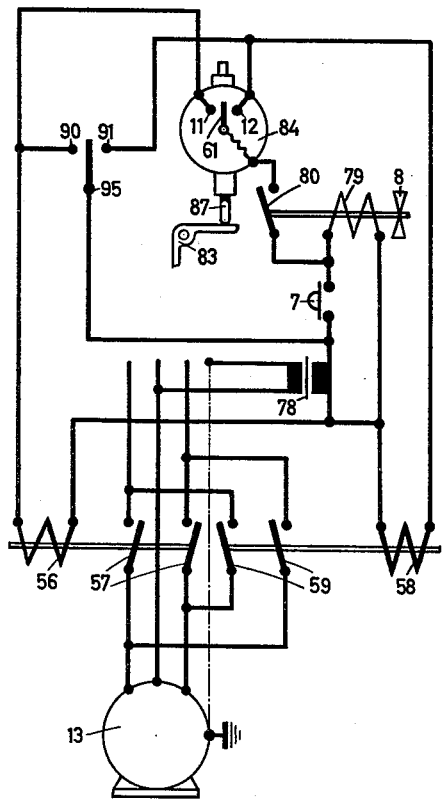
FIG. 3 is a diagram illustrating the control circuit controlling the adjusting motor in accordance with the position of the feeler.

Referring now to FIG. 3, which illustrates the electric circuit used in the embodiment of FIG. 1, the field windings of motor 13 are connected to a pair of switches 57 and 59 by which the motor can be reversed, or disconnected. Switches 57 and 59 are operated by electromagnetic means 56 and 58. A transformer 78 has a primary winding connected to a source of voltage, and a secondary winding connected at one end to the coils of electromagnetic means 56 and 58. The other end of the secondary winding of transformer 78 is connected to the control switch 7, and to a manually operated switch 95 which can be shifted between positions in contact with stationary contacts 90 or 91. When the manually operated switch 95 is connected to contact 90, electromagnetic means 56 is energized, and effects through switch 57 turning of motor 13 in one direction, whereas switch 95 in contact with contact 91 will effect energization of electromagnetic means 58, actuation of switch 59, and running of motor 13 in the opposite direction.

The manually operated switch 95 is used for presetting support 14 with pressure roller 2 in accordance with the indication on a scale 92 by pointer 93.

As explained above, the meter 84 has a movable contact 61 cooperating with two terminal contacts 11 and 12. Movable contact 61 is connected in series with a delay switch 80 controlled by a delay relay 79, 8. Delay switch 80 is connected in series with control switch 7, while the coil 79 connects control switch 7 with the secondary winding of transformer 78.

When a sheet material is inserted between the rollers 2 and 3, counter-pressure roller 3 is displaced, and closes control switch 7. A current flows through winding 79, so that delay switch 80 closes after a delay corresponding to the time required for the split off layer of the workpiece to reach the feeler roller 6.

As long as there is no workpiece between the rollers 2 and 3, the feeler roller 6 is urged by a spring 55 toward roller 2, corresponding to a workpiece which is too thin, and consequently movable contact 61 abuts the stationary contact 12. However, since control switch 7 is open as long as there is no workpiece between the rollers 2 and 3, no current can flow through coil 58. As explained above, a workpiece inserted between rollers 2 and 3 will effect closing of switch 7, and after a delay, closing of switch 80 so that at the time a split layer is sensed by the feeler roller 6, the circuit can be completed through contacts 61, 12, switches 7, 80, and electromagnetic means 58 by which switch 59 is closed to effect rotation of motor 13, and adjustment of the position of pressure roller 2. Such adjustment takes place, if the split layer is too thin. However, if the split layer is too thick, sensing finger 86 will be displaced by feeler lever 83, 88, and the movable contact 61 will engage the stationary contact 11, and effect through electromagnetic means 56 closing of switch 57 and turning of motor 13 in the opposite direction. If the split layer has a desired thickness c located within the range determined by the stationary contacts 11 and 12, movable contact 61 will assume an intermediate position in which no current will flow through any of the electromagnetic means 56 or 58, so that switches 57 and 59 will assume the position shown in FIG. 3 in which the motor 13 is at a standstill.

Since the compressibility of the workpiece cannot be exactly predicted, the preliminary setting may be wrong so that the movable contact 61 may at first engage either contact 11, or contact 12. However, in this event, motor 13 will be energized to adjust the position of the pressure roller 2 until the split layer has the desired thickness c. The variation of the thickness c is due to the fact that the pressure roller 2 presses workpiece 1 and counter-pressure roller 3 downwardly until the workpiece 1 assumes a position relative to the cutting edge 4 in which a layer of the desired thickness c is split off the sheet material of the workpiece. When the end of the workpiece passes between the two rollers 2 and 3, the control switch 7 opens and switch 80 also opens after a delay so that no undesired adjustment can take place when feeler roller 6 moves toward pressure roller 2 after the end of the split layer has passed out of the gap between rollers 2 and 6. A curved guide 81 is advantageously provided for guiding the split layer onto conveyor 41.

From the above description of a preferred embodiment of the invention, it will become apparent that the split-off layer is sensed by feeler means in its normal expanded condition so that the actual desired thickness of the layer determines the adjustment of the splitting apparatus. Any deviation from the desired thickness, within a narrow range of tolerances determined by the adjustable contacts 11 and 12, is used for obtaining the necessary adjustment of the apparatus. It is important that the split-off layer is transported at the same speed as the sheet material gripped by the transporting rollers, since otherwise the material would be gathered and accumulate between the feeler roller 6 and the transporting rollers. Consequently, a transporting roller driven in synchronism with transporting roller 2 may be provided opposite feeler roller 6, but in the preferred embodiment of the invention, feeler roller 6 is located directly opposite the transporting and pressure roller 2.

Figure 2:
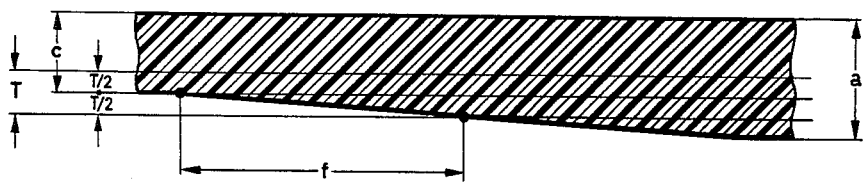
FIG. 2 is a longitudinal sectional view of a sheet material indicating the tolerances determining the maximum and minimum desirable thickness of the finished product.

A plane passing through the axis of roller 2 and the cutting edge 4 defines the line S on the peripheral surface of roller 2. Another plane through the axis of roller 2 and through the axis of roller 6 defines a line M on the peripheral surface of roller 2. The angular distance between points S and M is the arc $f$ which is shown in the diagrammatic view of FIG. 2. The sheet material has a normal thickness $a$, and the split layer has a thickness $c$. The range of tolerance is T, and is indicated by the two outer chain lines in FIG. 2. Any thickness between these outer lines is acceptable, but the desired accurate thickness $c$ is represented by the inner chain line which is spaced distances $T/2$ from the outer chain lines.

The control speed $Vr$ at which the pressure roller 2 is moved by the motor 13 is selected to be in a predetermined ratio with the transporting and feeding speed $Vv$ of the sheet material determined by the peripheral speed of pressure roller 2. The ratio must be selected in such a manner that when contact 61 separates from one of contacts 11 or 12 due to the fact that feeler roller 6 senses a thickness of the layer within the tolerance range, and motor 13 consequently stops, the desired thickness $c$ is exactly obtained due to the fact that the material travels the distance $f$ between the cutting edge 4 and the feeler roller 6.

From this follows:

$$\frac{Vr}{Vv}=\frac{T}{2f}$$

Since the distance $f$, as well as the range of tolerances T is predetermined, and since the transporting and feeding speed $Vv$ is given by the machine, the control speed $Vr$ can be determined from the above equation without any difficulty. The ratio betweeen the control speed and the feeding speed is kept constant so that intended or necessary variations of the feeding speed, for example when very hard workpieces are split, have no influence on the exactness of the adjustment to the desired thickness.

At the beginning of a splitting operation, the desired thickness of the usable layer is roughly pre-set by operation of the manually operated switch 95 whose shifting will effect rotation of motor 13 in opposite directions, and corresponding movement of pressure roller toward and away from the counter-pressure roller 3 so that the position of the pressure roller 2 is indicated by pointer 93 on scale 92. This scale does not necessarily indicate the thicknesses $c$, but can also be related to the compressibility of the sheet material. For example, batches of animal skins may be assorted in accordance with their different compressibility, and in this event separate scales can be provided for setting the machine in accordance with the indicated percentages of the ratio of compressibility between the thickness $a$ and the thickness $e$. Scales and tables can also be devised in which, for each previously determined percentage ratio of compressibility, the desired thickness of the split layer can be set. It is only necessary to set the same desired thickness, for example in millimeter, on the scale 48 by which the position of the meter 84 is determined.

By suitable selection of the length of the arms 83 and 88 of the sensing lever 83, and by properly positioning the fulcrum of the sensing lever 83, 88, distortions affecting the cooperation between the feeler roller 6, and the operation of the meter finger 87, can be held within negligible limits.

The delay relay 79, 8 is designed in such a manner that delay switch 80 closes after the time required for the workpiece to move through the arc $f$ from the cutting line S to the sensing line M, in other words the meter becomes effective only when the workpiece is being sensed by the feeler roller 6.

It is advantageous to construct the counter-pressure roller 3 of a plurality of independently movable axial roller sections, each of which is mounted on a supporting arm 26. In this manner, the pressure of pressure roller 3 does not produce a greater specific pressure on narrower workpieces than on wider workpieces, which may result in an undesired variation of the thickness of the finished product due to the different compression of narrow and wide workpieces. If the counter-pressure roller is constructed of several axial roller sections, only those sections which support a workpiece, will be displaced, moving with the correlated arms 26 against the pressure of the respective correlated springs 29.

It is preferred to provide adjusting means for spring 55 so that the pressure of the feeler roller on the workpiece can be adjusted in accordance with the compressibility and resiliency of the workpiece.

As explained above, the machine automatically adjusts itself while the first workpiece is run through the machine. However, this requires a certain length of the first workpiece, and when the first workpiece is too short, it is advisable to run the same two or three times through the machine until the machine is accurately set to the desired thickness.

The particular advantage of the arrangement of the present invention resides in that the machine can be set to a desired thickness of the product, whereupon the machine will automatically adjust itself to the desired thickness, and will again carry out an automatic adjustment when for any reason whatsoever, for example varying properties of the material such as variations of the hardness and resiliency, the obtained thickness falls outside of the range of tolerances.

It will be understood that each of the elements described above, or two or more together, may also find a useful application in other types of splitting machines for splitting sheet material, such as animal skins, differing from the types described above.

While the invention has been illustrated and described as embodied in a control arrangement for automatically adjusting a splitting machine in accordance with the thickness of the split-off layer, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A splitting machine comprising, in combination, a cutting means; transporting means for transporting a sheet material in one direction toward said cutting means and for pressing the sheet material against the same so that the sheet material is compressed and split into two layers which resiliently expand behind said cutting means; and a control device including a feeler located behind said cutting means in said direction for directly sensing the thickness of one of said expanded layers, said control device being operatively connected to one of said means to adjust the position thereof relative to the other of said means until said feeler senses a desired thickness of said one layer whereby a layer of the desired thickness is obtained irrespective of the thickness, compressibility and actual compression of the sheet material.

2. A splitting machine comprising, in combination, a cutting means; transporting means for transporting a sheet material in one direction toward said cutting means and for pressing the sheet material against the same so that the sheet material is compressed and split into two layers which resiliently expand behind said cutting means; and a control device including a feeler located behind said cutting means in said direction for engaging one of said expanded layers and for directly sensing the thickness thereof, said control device being operatively connected to said transporting means to adjust the position thereof relative to said cutting means until said feeler senses a desired thickness of said one layer whereby a layer of the desired thickness is obtained irrespective of the thickness, compressibility and actual compression of the sheet material.

3. A splitting machine comprising, in combination, a cutting means located in a working plane; transporting means including a first roller and a second roller for transporting a sheet material in said working plane in one direction toward said cutting means and for pressing the sheet material against the same, said first roller being movable toward said second roller and toward said cutting means in a transverse direction so that the sheet material is compressed and split into two layers which resiliently expand behind said cutting means; and a control device including a feeler located behind said cutting means in said one direction and opposite one of said rollers for engaging one of said expanded layers and for directly sensing the thickness thereof, said control device being operatively connected to said first roller to adjust the position thereof relative to said second roller until said feeler senses a desired thickness of said one layer whereby a layer of the desired thickness is obtained irrespective of the thickness, compressibility and actual compression of the sheet material.

4. A splitting machine comprising, in combination, a cutting means; transporting means including a counter-pressure means, a pressure roller, and a support turnably supporting said pressure roller and being movable with the same toward and away from said counter-pressure means, said roller being driven to transport a sheet material in one direction toward said cutting means, and to press the sheet material against the same so that the sheet material is compressed and split into two layers which resiliently expand behind said cutting means; a feeler means located behind said cutting means in said direction and opposite said pressure roller for sensing the thickness of the one of said expanded layers which passes between said pressure roller and said feeler means; and operating means connected to said support and being controlled by said feeler means to move said pressure roller toward and away from said counter-pressure means and said cutting means until said feeler means senses a desired thickness of said one layer whereby a layer of the desired thickness is obtained irrespective of the thickness, compressibility and actual compression of the sheet material.

5. A splitting machine comprising, in combination, a cutting means; transporting means including a counter-pressure means, a pressure roller, and a support turnably supporting said pressure roller and being movable with the same toward and away from said counter-pressure means, said roller being driven to transport a sheet material in one direction toward said cutting means, and to press the sheet material against the same so that the sheet material is compressed and split into two layers which resiliently expand behind said cutting means; a feeler means turnably mounted on said support and having a feeler portion located behind said cutting means in said direction and opposite said pressure roller for sensing the thickness of the one of said expanded layers which passes between said pressure roller and said feeler means; and operating means connected to said support and being controlled by said feeler means to move said pressure roller toward and away from said counter-pressure means and said cutting means until said feeler means senses a desired thickness of said one layer whereby a layer of the desired thickness is obtained irrespective of the thickness, compressibility and actual compression of the sheet material.

6. A splitting machine comprising, in combination, a cutting means; transporting means including a counter-pressure means, a pressure roller, and a support turnably supporting said pressure roller and being movable with the same toward and away from said counter-pressure means, said roller being driven to transport a sheet material in one direction toward said cutting means, and to press the sheet material against the same so that the sheet material is compressed and split into two layers which resiliently expand behind said cutting means; a feeler means turnably mounted on said support and including a turnable feeler roller located behind said cutting means in said direction and opposite said pressure roller for sensing the thickness of the one of said expanded layers which passes between said pressure roller and said feeler means, said feeler means including resilient means for urging said feeler roller toward said pressure roller and against said one layer; and operating means connected to said support and being controlled by said feeler means to move said pressure roller toward and away from said counter-pressure means and said cutting means until said feeler means senses a desired thickness of said one layer whereby a layer of the desired thickness is obtained irrespective of the thickness, compressibility and actual compression of the sheet material.

7. A splitting machine comprising, in combination, a cutting machine; transporting means including a counter-pressure means, a pressure roller, and a support turnably supporting said pressure roller and being movable with the same toward and away from said counter-pressure means, said roller being driven at a selected speed to transport a sheet material at a selected feeding speed in one direction toward said cutting means, and to press the sheet material against the same so that the sheet material is compressed and split into two layers which resiliently expand behind said cutting means; a feeler means located behind said cutting means in said direction and opposite said pressure roller for sensing the thickness of the one of said expanded layers which passes between said pressure roller and said feeler means; and operating means connected to said support and being controlled by said feeler means to move said pressure roller toward and away from said counter-pressure means and said cutting means at a selected control speed until said feeler means senses a desired thickness of said one layer whereby a layer of desired thickness is obtained irrespective of the thickness, compressibility and actual compression of the sheet material, said feeding speed and said control speed having such a ratio that during the movement of any portion of said one layer from said cutting means to said feeler, said pressure roller moves a distance substantially equal to half of the total tolerance between the maximum and minimum values of said desired thickness.

8. A splitting machine comprising, in combination, a cutting means; transporting means for transporting a sheet material at a selected feeding speed in one direction toward said cutting means and for pressing the sheet material against the same so that the sheet material is compressed and split into two layers which resiliently expand behind said cutting means; and a control device including a feeler located behind said cutting means in said direction for engaging one of said expanded layers and for directly sensing the thickness thereof, said control device being operatively connected to one of said means to adjust the position thereof relative to the other of said means at a selected control speed until said feeler senses a desired thickness of said one layer whereby a layer of the desired thickness is obtained irrespective of the thickness, compressibility and actual compression of the sheet material, said feeding speed and said control speed having such a ratio that during the movement of any portion of said one layer from said cutting means to said feeler, said pressure roller moves a distance substantially equal to half of the total tolerance between the maximum and minimum values of said desired thickness.

9. A splitting machine comprising, in combination, a cutting means; transporting means including a counter-pressure means, a pressure roller, and a support turnably supporting said pressure roller and being movable with the same toward and away from said counter-pressure means, said roller being driven to transport a sheet material in one direction toward said cutting means, and to press the sheet material against the same so that the sheet material is compressed and split into two layers which resiliently expand behind said cutting means; a feeler means located behind said cutting means in said direction and opposite said pressure roller for sensing the thickness of the one of said expanded layers which passes between said pressure roller and said feeler means; and operating means including a motor, transmission means driven by said motor and connected to said support, a control circuit connected to said motor and including switch means for effecting turning of said motor in opposite directions and stopping of said motor, said switch means being operatively connected to said feeler means and controlled by the same to effect movement of said pressure roller toward and away from said counter-pressure means and said cutting means until said feeler means senses a desired thickness of said one layer whereby a layer of the desired thickness is obtained irrespective of the thickness, compressibility and actual compression of the sheet material.

10. A splitting machine comprising, in combination, a cutting means; transporting means including a counter-pressure means; a pressure roller, and a support turnably supporting said pressure roller and being movable with the same toward and away from said counter-pressure means, said roller being driven to transport a sheet material in one direction toward said cutting means, and to press the sheet material against the same so that the sheet material is compressed and split into two layers which resiliently expand behind said cutting means; a feeler means located behind said cutting means in said direction and opposite said pressure roller for sensing the thickness of the one of said expanded layers which passes between said pressure roller and said feeler means; and operating means including a motor, transmission means driven by said motor and connected to said support, a control circuit connected to said motor and including switch means for effecting turning of said motor in opposite directions and stopping of said motor, and a meter mounted on said support for measuring the displacement of said feeler means, said meter including a movable contact and two fixed contacts on opposite sides of said movable contact, said control circuit including electromagnetic means for operating said switch means, and said contacts being connected to said electromagnetic means for energizing the same to effect operation of said switch means so that the same are controlled to effect movement of said pressure roller toward and away from said counter-pressure means and said cutting means until said feeler means senses a desired thickness of said one layer whereby a layer of the desired thickness is obtained irrespective of the thickness, compressibility and actual compression of the sheet material.

11. A machine as set forth in claim 10 wherein said circuit includes manually operated switch means for effecting energizing of said electromagnetic means whereby said pressure roller can be set to a selected position.

12. A machine as set forth in claim 11 including an indicating means on said support, and a cooperating stationary indicating means whereby the distance between said pressure means, and said counter-pressure roller and cutting means can be pre-set.

13. A machine as set forth in claim 10 and including a slide mounted on said support for movement in the direction in which said support moves; and manually operated adjusting means on said support connected to said slide for moving the same, said slide supporting said meter.

14. A machine as set forth in claim 13 wherein said feeler means includes a lever pivotally mounted on said support, and a feeler roll turnably mounted on said lever and located opposite said pressure roller for sensing said one layer; and spring means intermediate said lever and said support for urging said feeler roller against said one layer.

15. A machine as set forth in claim 13 wherein said adjusting means includes a micrometer screw; including indicating means on said support for indicating the position of said slide; and stop means for stopping said slide in two end positions.

16. A splitting machine comprising, in combination, a cutting means located in a working plane; transporting means including a resiliently supported counter-pressure means, a pressure roller, and a support turnably supporting said pressure roller and being movable with the same toward and away from said counter-pressure means, said roller being driven to transport a sheet material in one direction toward said cutting means, and to press the sheet material against the same so that the sheet material is compresesd and split into two layers which resiliently expand behind said cutting means; stop means for stopping said counter-pressure means when its extremity is located in said working plane; a feeler means located behind said cutting means in said direction and opposite said pressure roller for sensing the thickness of the one of said expanded layers which passes between said pressure roller and said feeler means; and operating means including a motor, transmission means driven by said motor and connected to said support, a control circuit connected to said motor and including a normally open control switch located to be closed by said counter-pressure means when the same is displaced out of said working plane by the sheet material under pressure of said pressure roller, switch means for effecting turning of said motor in opposite directions and stopping of said motor, and a meter mounted on said support for measuring the displacement of said feeler means, said meter including a movable contact and two fixed contacts on opposite sides of said movable contact, said control circuit including electromagnetic means for operating said switch means, and said contacts being connected to said electromagnetic means for energizing the same to effect operation of said switch means so that the same are controlled to effect movement of said pressure roller toward and away from said counter-pressure means and said cutting means until said feeler means senses a desired thickness of said one layer whereby a layer of the desired thickness is obtained irrespective of the thickness, compressibility and actual compression of the sheet material.

17. A machine as set forth in claim 16 wherein said control circuit includes delay means connected to said control switch so that the movable contact in the meter can energize the electromagnetic means only after a delay when a sheet material placed between said pressure roller and said counter-pressure means is located between said pressure roller and said feeler means.

18. A machine as set forth in claim 17 wherein said delay means includes a delay switch connected in series with said movable contact and said control switch, and an electromagnet connected in series with said control switch and with one pole of a transformer; said feeler means including a feeler portion adapted to engage said one layer and a movable arm cooperating with said meter; the arrangement being such that said motor is only energized to adjust the position of said pressure roller when said one layer is transported to a position located between said pressure roller and said feeler portion before opening said control switch.

19. A machine as set forth in claim 16 wherein said resiliently supported counter-pressure means includes a movable support, a counter-pressure roller turnably mounted on said support and located opposite said pressure roller, a spring-loaded shiftable member abutting said movable support for urging said counter-pressure roller toward said pressure roller, and a stop for stopping movement of said shiftable member in a position in which the peripheral surface of said counter-pressure roller is located in said working plane; and wherein said control switch is operated by said shiftable member.

20. A splitting machine comprising, in combination, a cutting means located in a working plane; transporting means including a resiliently supported counter-pressure roller, a pressure roller, and a support turnably supporting said pressure roller and being movable with the same toward and away from said counter-pressure roller, said pressure roller being driven to transport a sheet material in one direction toward said cutting means, and to press the sheet material against the same so that the sheet material is compressed and split into two layers which resiliently expand behind said cutting means; stop means for stopping said counter-pressure roller when its peripheral surface is located in said working plane of said cutting means; a normally open control switch located to be closed when said counter-pressure roller is displaced by sheet material located between said rollers; a feeler means located behind said cutting means in said direction and opposite said pressure roller for sensing the thickness of the one of said expanded layers which pasess between said pressure roller and said feeler means; and operating means including a motor, transmission means driven by said motor and connected to said support, a control circuit connected to said motor and to said control switch so that said motor is disconnected when said control switch is open, said control circuit including switch means for effecting turning of said motor in opposite directions and stopping of said motor, said switch means being operatively connected to said feeler means and controlled by the same to effect movement of said pressure roller toward and away from said counter-pressure roller and said cutting means until said feeler means senses a desired thickness of said one layer whereby a layer of the desired thickness is obtained irrespective of the thickness, compressibility and actual compression of the sheet material.

References Cited in the file of this patent

UNITED STATES PATENTS

| | | |
|---|---|---|
| 2,339,359 | Shayne et al. | Jan. 18, 1944 |
| 2,367,685 | Metcalf | Jan. 23, 1945 |